Feb. 28, 1956   B. W. HANCOX   2,736,333
LOW PRESSURE SEALING VALVES
Filed Dec. 7, 1951

Inventor:
Burton W. Hancox
by his Attorneys
Howson & Howson

2,736,333
LOW PRESSURE SEALING VALVES
Burton W. Hancox, Springfield, Pa.

Application December 7, 1951, Serial No. 260,425

5 Claims. (Cl. 137—232)

This invention relates to fluid valves and more particularly to a sensitive low pressure valve of the type used for inflatable objects such as tourniquets, rubber tubes, and bladders.

The important features of the present invention cooperate to provide an efficient inexpensive valve assembly having no springs, no flutter, and sufficiently sensitive to permit the introduction of low pressures with adequate sealing.

A primary object of the invention, therefore, is to provide a sensitive low pressure sealing valve assembly in which the valve element is actuated to open or close the valve by fluid pressure.

A further object of the invention is to provide a valve assembly having a non-metallic disk-like valve floating in a confined valve chamber so dimensioned that the valve is capable of being tilted about an edge portion by pressure increments less than the pressure necessary to lift the entire weight of the valve.

A further object of the invention is to provide a valve assembly having a movable disk-like valve element and suitable fluid passages positioned to be opened and closed by the valve element, the passages being so proportioned and arranged that the valve does not flutter.

A still further object of the invention is to provide in a valve assembly of the type disclosed, suitable means for unseating the valve member.

Figure 1:
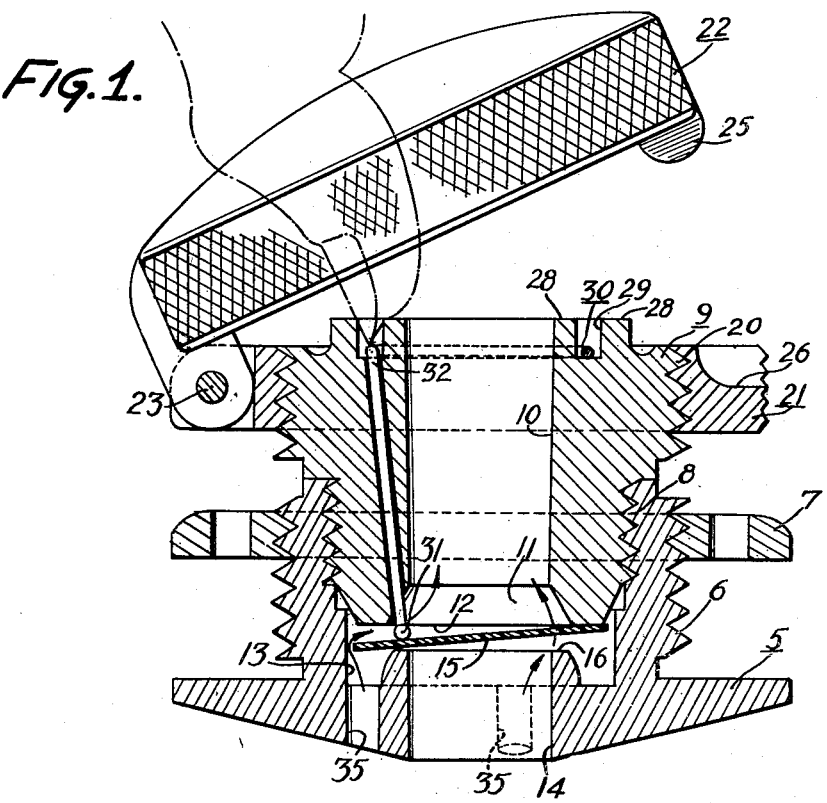
Figure 2:
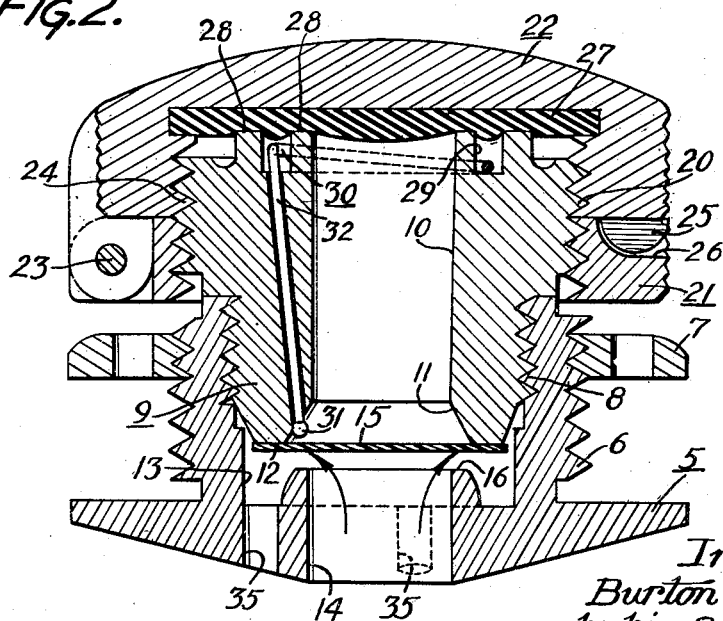

Further objects will be apparent from the specifications and drawings in which:

Fig. 1 is a greatly enlarged vertical section of my improved valve assembly showing the valve in an unseated position, and Fig. 2 is a view similar to Fig. 1 but with the valve seated and the valve cap closed.

The invention comprises essentially the provision in a valve assembly of an outer fluid passage terminating in an annular valve seat. A valve disk, preferably of mica or a synthetic plastic material, is positioned to close the valve seat and the disk is free to float in a confined chamber located between the valve seat and the terminal face of an inner fluid passage having a bore of substantially equal diameter to the bore of the outer fluid passage. This inner bore or fluid passage, however, does not provide the main fluid passage into or out of the valve assembly. A plurality of secondary passages are provided around the periphery of the inner passage, and these secondary passages provide continuous fluid communication between the chamber and the object to which the valve assembly may be attached.

Referring now more particularly to the drawings, a preferred embodiment of the invention comprises a valve body 5 which may be cemented or otherwise secured to an inflatable tube or chamber (not shown). The body 5 is provided with external threads 6 which carry a clamp nut 7 that can be turned down to provide a leak-proof seal between the valve body 5 and the inflatable member. A portion of the bore of valve body 5 is provided with internal threads 8 which carry the valve seat member 9. Member 9 has a relatively large bore or passage 10 which flares radially outwardly at 11 and defines an annular valve seat 12. It will be noted that valve seat 12 fits into and is less in diameter than the bore of valve chamber 13 in body 5. Valve body 5 has a bore or passage 14 of substantially the same diameter as passage 10 and in alignment therewith. The walls of passage 14 extend into chamber 13 to control floating movement of the valve disk 15, and I have found that the clearance between the valve seat 12 and the annular face 16 is important in providing the desired non-flutter action for the valve disk 15. The clearance or space between the valve 15 and the annular face 16 when the valve is closed is critical and should be between .015"–.020". I prefer to use a mica disk having a thickness of approximately .0035", so that the maximum distance between the valve seat and the face 16 should not exceed .0235". It will also be noted that the diameter of the valve disk is less than the inside diameter of chamber 13 so that fluid is free to pass around the periphery of the disk at all times.

The valve seat member 9 is also provided with external threads 20 which carry an internally threaded collar 21 to which a valve cap 22 is pivoted at 23. The bore of cap 22 is likewise provided with internal threads 24 (Fig. 2) which form a continuation of the internal threads on collar 21 when the cap is closed. To open the cap, it is only necessary to unscrew the cap and collar a few turns from the closed position of Fig. 2 until the threads in the cap are disengaged from the threads on valve seat member 9. The cap 22 is then pivoted as shown in Fig. 1, but it is retained on the valve assembly because it is permanently attached to the collar 21 which ordinarily remains on the member 9. A tab 25 on the cap fits in a recess 26 in the collar to insure accurate alignment of the threads in the collar and the cap. A suitable gasket 27 may be inserted in the bore of the cap to effectively seal the annular faces 28, 28 of the valve element 9. It will be understood that for most purposes the valve 15 prevents leakage and, therefore, the cap may be omitted entirely. However, my novel cap is especially suitable for use in the event additional sealing is desired.

The valve seat member 9 is provided with an annular recess 29 in which a pressure releasing spring 30 is positioned. Spring 30 extends through the element 9 and has a flared end 31 which does not contact valve 15 when closed due to the tendency of the spring 30 to retract the plunger-like extension 32 of the spring. If desired to release pressure from the chamber to which the valve assembly is connected, the cap 22 is raised, as shown in Fig. 1, and the extension 32 is depressed by the fingernail or other suitable object. This unseats the valve 15, thus permitting fluid to escape. It is understood that any thin object may be used for the same purpose by inserting it into the bore 10. However, I have shown this particular construction for unseating the valve 15 in the event no other object is available, or in the event it is desired to avoid the use of such an object to prevent damage to the valve 15.

In operation it is only necessary to connect a source of fluid pressure to the passage 10 in order to fill the chamber or tube to which the valve assembly is attached. Application of external pressure through passage 10 automatically unseats valve 15 whereupon it is positioned on the annular face 16 thus closing bore 14. However, fluid freely passes around the edge of the valve and through passages 35, 35. As soon as the fluid pressure is removed from passage 10 so that the internal pressure becomes greater than the external pressure, the valve 15 immediately closes valve seat 12 due to the internal pressure exerted through passages 35, 35 and bore 14 on the larger area of the valve. When it is desired to release internal pressure, the valve is unseated, as shown in Fig. 1, as previously described. Whether only one edge of the valve unseats or whether the entire valve drops onto face 16, is, of course, immaterial.

It will be thus understood that I have provided an improved low pressure sealing valve which is extremely sensitive and which is operable to tilt about an edge portion by pressures less than pressures necessary to lift the entire weight of the valve disk. Due to the limited controlled movement of the valve, it is possible to eliminate a valve spring and also valve flutter. The provision of a large bore interiorly of the valve, which bore does not normally provide fluid passage but which permits a relatively large pressure area to act on the valve, assists in eliminating the necessity for a valve spring.

Having thus described my invention,

I claim:

1. A valve assembly comprising a valve body, clamping means on the periphery of said body for securing the body to an inflatable object, walls defining a first internal threaded bore in the body, walls defining a second unthreaded bore in the body of lesser diameter than said first bore, walls defining a third bore in said body of lesser diameter than said second bore, said third bore providing fluid communication through the valve body to the first and second bores, an annular face forming an internal continuation of the walls of the third bore extending into the second bore, a valve seat member threadedly engaged with the threads in the first bore, walls defining an axial concentric fluid passage in said valve seat member, an annular valve seat on the valve seat member at the inner terminus of said last named passage, said valve seat extending into the second bore of the body member and in predetermined axial spaced relation with the face thereon, the radial clearance in the body member between the walls forming said face and the walls forming the second bore together with the axial clearance between the face and the valve seat defining a valve chamber, a disc-like valve freely floating in said valve chamber mounted for movement between closed and open positions and operable in the closed position to engage said valve seat and prevent escape of fluid through the valve and at least one primary fluid passage in the valve body affording fluid communication through the valve body to the chamber in all positions of the valve.

2. A valve assembly constructed in accordance with claim 1 in which the third bore in the valve body is substantially of the same diameter as the fluid passage in the valve seat member.

3. A valve assembly in accordance with claim 1 having resilient retractable means in the valve seat member for unseating the valve to release fluid pressure.

4. A valve assembly in accordance with claim 1 having an annular cap seat on the outer end of the valve seat member, a groove surrounding said seat, and a spring seated in said groove and extending interiorly of the valve seat member to unseat the valve when the spring is pressed into the seat.

5. A valve assembly comprising a valve body having an inlet passage at one side thereof terminating at its inner end in a valve seat inside said body; walls defining a chamber adjacent said valve seat, said chamber being larger in diameter than said seat; a disk-like valve freely floating in said chamber and mounted for movement between closed and open positions and having one side operable to engage said valve seat to prevent the escape of fluid through said valve body when said disk-like valve is in its closed position, the outside dimension of the disk-like valve being sufficiently less than the dimension of said chamber to permit free fluid passage around the periphery of said disk-like valve; a face in the valve body oppositely disposed to said valve seat and defining a predetermined limited unseating clearance for the disk-like valve and operable to be engaged by the opposite side of said disk-like valve; walls defining a series of second fluid passages terminating in said face in register with said opposite side of said disk-like valve and providing fluid communication with the chamber in any position of said disk-like valve; an annular cap seat on the outer end of said inlet passage with an annular groove surrounding said cap seat; and a spring seated on said annular groove and having a portion extending interiorly of the valve seat to unseat said disk-like valve when said spring is pressed into said groove.

References Cited in the file of this patent

UNITED STATES PATENTS

| Number | Name | Date |
|---|---|---|
| 544,167 | Gustaveson | Aug. 6, 1895 |
| 605,549 | Johansson | June 14, 1898 |
| 641,345 | Storz | Jan. 16, 1900 |
| 922,578 | Gries | May 25, 1909 |
| 2,084,294 | Cooper | June 15, 1937 |
| 2,333,288 | Benzel | Nov. 2, 1943 |

FOREIGN PATENTS

| Number | Country | Date |
|---|---|---|
| 13,441 | Great Britain | June 1, 1897 |
| 21,847 | Great Britain | of 1896 |
| 923,625 | France | July 11, 1947 |